United States Patent
Cho et al.

(10) Patent No.: US 8,197,082 B2
(45) Date of Patent: Jun. 12, 2012

(54) LIGHT SOURCE BLOCK ASSEMBLY AND BACKLIGHT UNIT AND LIQUID CRYSTAL DISPLAY HAVING THE SAME

(75) Inventors: Joo-Woan Cho, Asan-si (KR); Seong-Sik Choi, Seoul (KR); Byung-Choon Yang, Seoul (KR)

(73) Assignee: Samsung Electronics Co., Ltd. (KR)

( * ) Notice: Subject to any disclaimer, the term of this patent is extended or adjusted under 35 U.S.C. 154(b) by 986 days.

(21) Appl. No.: 12/182,939

(22) Filed: Jul. 30, 2008

(65) Prior Publication Data

US 2009/0141210 A1 Jun. 4, 2009

(30) Foreign Application Priority Data

Nov. 29, 2007 (KR) .................. 10-2007-0122434

(51) Int. Cl.
  *G09F 13/04* (2006.01)
(52) U.S. Cl. ............. 362/97.3; 362/249.02; 362/249.14; 362/631; 439/65
(58) Field of Classification Search ............. 362/249.02, 362/249.06, 249.14, 646, 800, 97.1–97.3, 362/227, 249.01, 600, 601, 630, 631; 439/56, 439/61, 62, 65
See application file for complete search history.

(56) References Cited

U.S. PATENT DOCUMENTS

| | | | | |
|---|---|---|---|---|
| 4,667,277 A * | 5/1987 | Hanchar | .................. | 362/249.01 |
| 5,186,632 A * | 2/1993 | Horton et al. | .................... | 439/67 |
| 5,404,282 A * | 4/1995 | Klinke et al. | ............ | 362/249.06 |
| 5,436,809 A * | 7/1995 | Brassier et al. | ............... | 362/545 |
| 5,660,461 A * | 8/1997 | Ignatius et al. | ............... | 362/241 |
| 6,170,963 B1 * | 1/2001 | Arnold | .......................... | 362/246 |
| 6,422,716 B2 * | 7/2002 | Henrici et al. | ................. | 362/235 |
| 6,659,623 B2 * | 12/2003 | Friend | ....................... | 362/249.06 |
| 6,923,557 B2 * | 8/2005 | Jahn et al. | ...................... | 362/382 |
| 7,201,511 B2 * | 4/2007 | Moriyama et al. | ............. | 362/646 |
| 7,458,705 B2 * | 12/2008 | Chiba et al. | .................... | 362/362 |
| 7,744,233 B2 * | 6/2010 | Moriyasu et al. | ............ | 362/97.3 |
| 7,764,334 B2 * | 7/2010 | Kitagawa et al. | ............... | 349/65 |
| 7,775,681 B2 * | 8/2010 | Kim et al. | ................ | 362/249.02 |
| 7,832,897 B2 * | 11/2010 | Ku | ............. | 362/249.02 |
| 7,850,355 B2 * | 12/2010 | Goto et al. | .................... | 362/607 |
| 7,883,230 B2 * | 2/2011 | Kim et al. | .................... | 362/97.1 |
| 7,946,727 B2 * | 5/2011 | Lee | .......................... | 362/249.06 |
| 7,956,544 B2 * | 6/2011 | Kang et al. | .................... | 315/161 |
| 7,985,002 B2 * | 7/2011 | Wu | ......................... | 362/249.02 |
| 2007/0115671 A1 * | 5/2007 | Roberts et al. | ................ | 362/367 |
| 2008/0078524 A1 * | 4/2008 | Wilcox et al. | ................ | 165/11.1 |
| 2008/0291669 A1 * | 11/2008 | Roberts et al. | ................ | 362/227 |
| 2009/0086478 A1 * | 4/2009 | Sanroma et al. | ............. | 362/234 |
| 2009/0122537 A1 * | 5/2009 | Cheng et al. | .................. | 362/235 |
| 2010/0079976 A1 * | 4/2010 | Kamada | ........................ | 362/97.1 |
| 2010/0097544 A1 * | 4/2010 | Jung et al. | ........................ | 349/71 |
| 2010/0103651 A1 * | 4/2010 | Park | ............................. | 362/97.1 |

* cited by examiner

*Primary Examiner* — John A Ward
(74) *Attorney, Agent, or Firm* — Innovation Counsel LLP

(57) ABSTRACT

The present invention relates to a backlight unit with a light emitting diode block assembly connected thereto, and a liquid crystal display having the backlight unit. In one embodiment, the backlight unit includes a plurality of light source blocks each of which includes a substrate having a light source and an electrode portion formed thereon; a connector electrically connecting the light source blocks to each other, coupled to the light source blocks in contact with one side of the connector, and fastening the light source blocks to each other by cross-coupling the light source blocks; and a supporter disposed on the other side of the connector. In this manner, LED blocks can be simultaneously both electrically and mechanically coupled, using a relatively small and simple number of connectors, facilitating reliability and ease of manufacture.

20 Claims, 11 Drawing Sheets

LIGHT SOURCE BLOCK ASSEMBLY AND BACKLIGHT UNIT AND LIQUID CRYSTAL DISPLAY HAVING THE SAME

This application claims priority to Korean Patent application No. 10-2007-0122434, filed on Nov. 29, 2007, and all the benefits accruing therefrom under 35 U.S.C. 119, the contents of which are herein incorporated by reference in their entirety.

BACKGROUND OF THE INVENTION

1. Field of the Invention

The present invention relates to a backlight unit and a liquid crystal display having the same. More particularly, the present invention relates to a backlight unit with a light emitting diode block assembly connected thereto, and a liquid crystal display having the backlight unit.

2. Description of the Related Art

Recently, flat panel displays such as liquid crystal displays (LCDs) and plasma display panels (PDPs) have been developed to replace cathode ray tubes (CRTs). However, unlike PDPs, LCDs do not have a self light-emitting structure and thus utilize a light source. Therefore, current LCDs commonly employ a variety of light sources. These light sources are typically used as backlights, and are thus usually disposed in the rear of an LCD panel. In general, these backlights usually employ a point light source such as a light emitting diode (LED), a linear light source such as an electroluminescent lamp (EL), or a cold cathode fluorescent lamp (CCFL).

Problems have arisen with LED backlights used with LCDs larger than 40 inches. Due to current limitations in the surface mount technology (SMT) used to mount these LEDs, larger-size LED fields must be grouped into blocks of LEDs, which are connected to each other. Currently, these LED blocks are physically and electrically connected to each other by wired connectors.

This connection method requires mounting the connector, including its wiring, before connecting the LED blocks. During this process, electrical connections may not be formed properly, resulting in unreliable electrical connections. Moreover, as the number of connectors and the amount of wiring increases, it has become more difficult to reliably accommodate the increased amount of wiring within the space constraints of the connectors.

SUMMARY OF THE INVENTION

The invention can be implemented as at least a light source block assembly, a backlight unit, and a liquid crystal display.

In one embodiment of the invention, a light source block assembly comprises a plurality of light source blocks, each of the light source blocks including a substrate having an external connection electrode portion formed on one end and a light source formed thereon, the electrode portion of each light source block in electrical communication with the respective light source so as to supply power to the respective light source. The assembly also includes a connector electrically connecting at least two of the light source blocks and fastening the at least two light source blocks to each other along a first side of the connector. Also included is a supporter disposed on a second side of the connector.

In another embodiment of the invention, a backlight unit comprises a light source block assembly including a plurality of light source blocks, as well as a receiving member for accommodating the light source block assembly. Each of the light source blocks includes a substrate with a light source and an external connection electrode portion provided thereon, a connector electrically connecting the light source blocks to each other and coupled to the substrate along a first side, and a supporter disposed on a second side of the connector.

In yet another embodiment of the invention, a liquid crystal display comprises a backlight unit including light sources, each of the light sources having a light emitting diode. The display also includes a light source block assembly having a plurality of light source blocks, each of the light source blocks including a substrate with at least one of the light sources and an external connection electrode portion provided thereon, and a connector electrically connecting at least two of the light source blocks to each other and coupled to the at least two light source blocks along a first side of the connector; and a receiving member for accommodating the light source block assembly. The display further includes a liquid crystal display panel supplied with light from the backlight unit so as to facilitate display of an image.

BRIEF DESCRIPTION OF THE DRAWINGS

Preferred embodiments of the present invention can be understood in more detail from the following description taken in conjunction with the accompanying drawings, in which.

DETAILED DESCRIPTION OF THE PREFERRED EMBODIMENT

Hereinafter, exemplary embodiments of the present invention will be described in detail with reference to the accompanying drawings.

However, the present invention is not limited to the embodiments disclosed below but may be implemented in different forms. These embodiments are provided only for illustrative purposes and for full understanding of the scope of the present invention by those skilled in the art. Throughout the drawings, like reference numerals are used to designate like elements.

Light Source Block Assembly

<First Embodiment>

Figure 1:
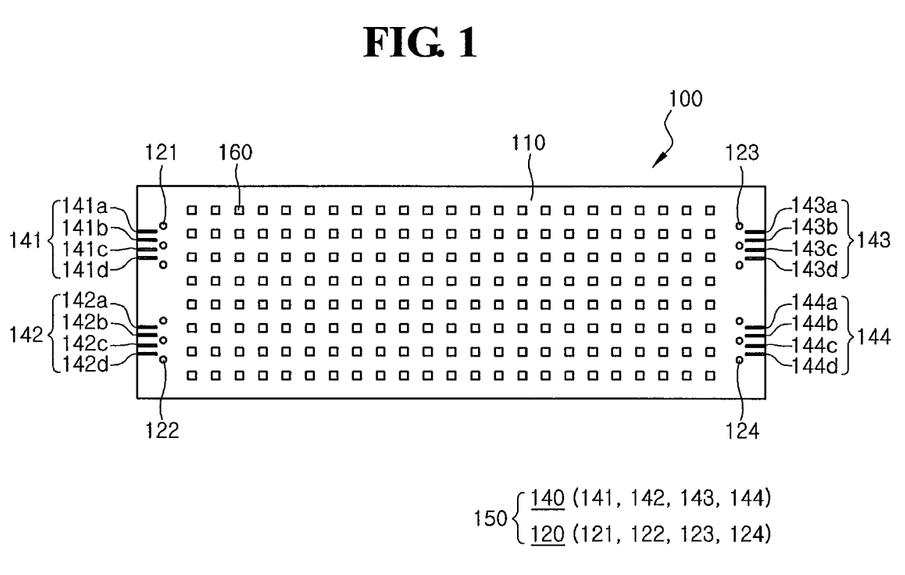
FIG. 1 is a plan view illustrating a light emitting diode block.
Figure 2:
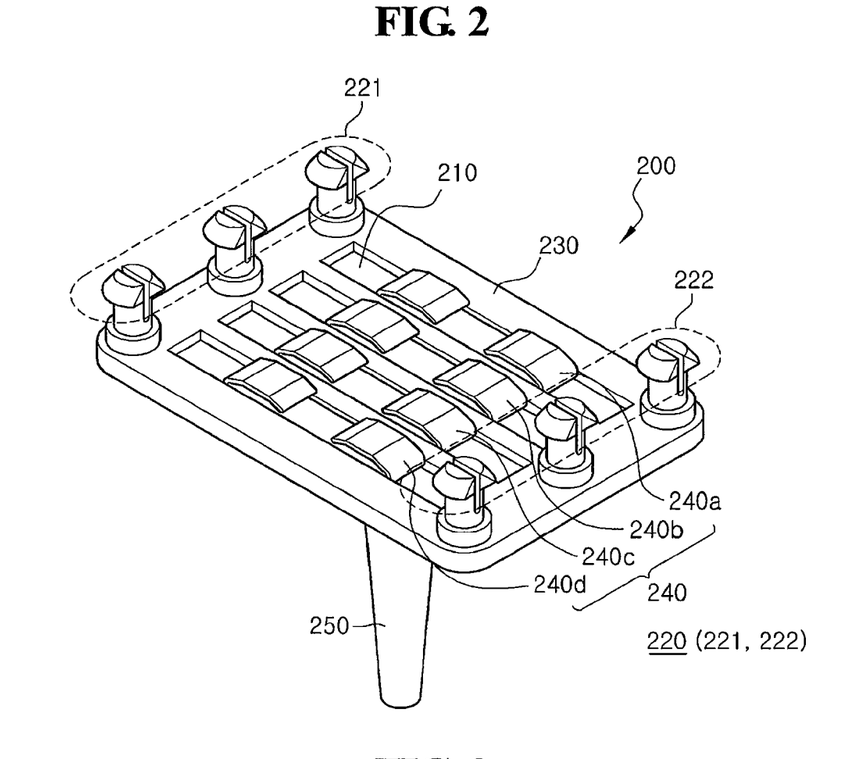
FIG. 2 is a perspective view illustrating a connector according to a first embodiment of the present invention.
Figure 3:
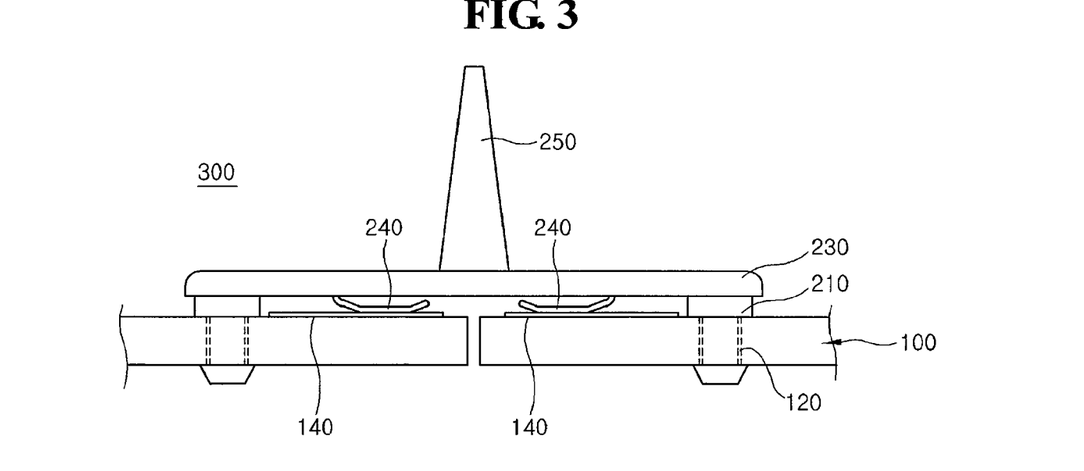
FIG. 3 is a schematic side view illustrating a state after the connector according to the first embodiment of the present invention is fastened to the light emitting diode blocks.

FIG. 1 is a plan view illustrating a light emitting diode block, FIG. 2 is a perspective view illustrating a connector according to a first embodiment of the present invention, and FIG. 3 is a schematic side view illustrating the connector and LED block of FIGS. 1-2 as assembled.

Referring to FIG. 1, an LED block 100 includes LEDs 160, a substrate 110 for mounting the LEDs 160 thereto, and connecting portions 150 formed on both opposite sides of the substrate 110.

The LED 160, which is a light source of the light source block according to the first embodiment of the present invention, may include a light emitting chip in the form of a compound semiconductor laminate having a p-n junction structure to emit light through recombination of minority carriers (electrons or holes), a base member to be mounted with the light emitting chip thereon, and an external power input member for applying external power to the light emitting chip. According to the first embodiment of the present invention, a plurality of the LEDs 160 may be used so as to achieve the luminance required by an LCD.

The substrate 110, which is mounted with the LEDs 160 and allows external power to be supplied thereto, may include various kinds of printed circuit boards (PCBs) such as FR4, metal core PCBs (NCPCBs), or the like. In order to mount the plurality of LEDs 160 and apply external power thereto, the substrate 110 is formed with predetermined wiring. The plurality of LEDs 160 can be electrically connected to each other through the wiring. In addition, the substrate 110 includes connecting portions 150 for connecting the plurality of LED blocks 100.

The connecting portions 150 fasten the plurality of LED blocks 100 to each other, and also allow power to be supplied to the LEDs 160. The connecting portions 150, each of which is composed of through portions and electrode portions 140 as a group, are formed on both the opposite sides of the substrate 110.

The through portions may be manufactured in the form of through holes 120 bored through the substrate. The through holes 120, to which a connector to be explained later is coupled to provide fastening force between the plurality of LED blocks 100 when they are connected, may include first to fourth through holes 121, 122, 123 and 124. Here, each of the first to fourth through holes 121, 122, 123 and 124 is actually a group of three through holes, as shown. Preferably, the first and second through holes 121 and 122 are formed in one side of the substrate 110 to be spaced apart from each other, and the third and fourth through holes 123 and 124 are formed in the other side of the substrate 110 to be spaced apart from each other. However, the present invention is not limited thereto. Each through hole 120 may be formed in one side of the substrate 110. Otherwise, two or more through holes 120 may be formed in one or both sides of the substrate 110. Preferably, the through hole 120, or more accurately the material at the edges of the hole 120, is made of a metal or other material sufficiently rigid to allow for secure coupling to the connector. In addition, the through hole 120 is preferably formed in a surface of the substrate 110 to be coupled with the connecting member of the connector.

The electrode portions 140, which are to supply external power to the LEDs 160 mounted on the LED blocks 100 when they are coupled, may include first to fourth electrode portions 141, 142, 143 and 144. Here, the first electrode portion 141 includes first to fourth electrodes 141a to 141d, and the second electrode portion 142 includes fifth to eighth electrodes 142a to 142d. In addition, the third electrode portion 143 includes ninth to twelfth electrodes 143a to 143d, and the fourth electrode portion 144 includes thirteenth to sixteenth electrodes 144a to 144d. The electrode portion 140 extends from wiring (not shown) formed on the substrate 110 and is formed by exposing the wiring at both the opposite sides of the substrate 110. In addition, the electrode portion 140 may be formed in a concave shape to be coupled to an electrode connecting portion of the connector, which will be described later. That is, a concave portion, e.g., a groove, may be formed in the substrate 110, and an electrode extending from the wiring may be provided on a bottom of the groove. Moreover, the electrode portion 140 may be formed adjacent to the through hole 120 so as to more firmly engage the electrode connecting portion 240 when the substrate 110 is coupled to the connector 200. Although it has been described in the above that each of the first to fourth electrode portions 141, 142, 143 and 144 is composed of four electrodes, the present invention is not limited thereto. The number of the electrodes of each of the first to fourth electrode portions 141, 142, 143 and 144 may be greater or less than four. For example, when the first and second electrode portions 141 and 142 are formed on one side of the substrate 110 and the third and fourth electrode portions 143 and 144 are formed on the other side thereof, each of the first to fourth electrode portions 141, 142, 143 and 144 may include one electrode to electrically connect the plurality of LED blocks 100 to each other. The number of electrode portions 140 may also vary.

The connecting portions 150 of the LED blocks 100 with the above configuration are connected by means of a connector 200. The connector 200, which couples the LED blocks 100 (FIG. 1) to each other, includes a base plate 230, connecting members 220 formed on the base plate 230, and electrode connecting portions 240, as shown in FIG. 2.

The connecting members 220, which are coupled to the through holes 120 (FIG. 1) of the LED blocks 100 to fasten them, include first and second connecting members 221 and 222. A hook-type connector is illustrated in this embodiment as an example of the connecting member 220. When fastened to the through hole 120, the hook-type connecting member 220 is deformed inside the through hole 120 to have an outer diameter smaller than an inner diameter of the through hole 120. Then, after passing through the through hole 120, the deformed connecting member 220 is restored so that an end projection of the connecting member 220 is fixed to and supported on the rear surface of the substrate 110. Therefore, the connecting member 220 is securely fastened to the substrate 110. Preferably, the first connecting member 221 is connected to the through hole 120 of one of the LED blocks, and the second connecting member 222 is connected to the through hole 120 of another of the LED blocks. To this end, the connecting member 220 and the through hole 120 formed in the substrate 110 are preferably formed corresponding in shape to each other. Here, preferably, the first and second connecting members 221 and 222 are respectively formed in plurality so as to enhance the fastening force between the LED blocks. In the embodiment illustrated, three of the first or second connecting members 221 or 222 are formed, although other embodiments of the invention can employ greater or less than three such connecting members. Each connecting member 220 is provided with a stepped portion in a region connected to the base plate 230, whereby foreign materials can be prevented from being introduced into the through hole 120 after the connecting member 220 is inserted into the through hole 120 of the substrate 110. At this time, an upper diameter of the connecting member 220 is larger than a lower diameter thereof due to the stepped portion. Preferably, the upper diameter is larger than the diameter of the through hole 120, and the lower diameter is equal to or smaller than the diameter of the through hole 120.

As shown in FIG. 3, the electrode connecting portions 240, which electrically connect the electrode portions 140 of two of the LED blocks when they are connected, include first to fourth electrode connecting portions 240a to 240d. The first to fourth electrode connecting portions 240a to 240d may be formed corresponding to the electrode portions 140 of the LED block 100. In addition, the electrode connecting portion 240 preferably has elasticity to allow it to flexibly and more firmly engage the electrode portion 140 of the LED block substrate 110. A leaf spring is illustrated as an example of the electrode connecting portion 240. In the embodiment shown, the electrode connecting portion 240 is brought into surface contact with the electrode portion 140. However, the present invention is not limited thereto. The electrode connecting portion may be formed in the shape of a protrusion. Moreover, the connecting portion may expand to increase the contact area.

To assemble the connector 200, grooves 210 corresponding to the electrode connecting portions 240 may be formed in the base plate 230, and then the electrode connecting portions 240 may be mounted to the grooves 210. At this time, a protruding portion, for example a hook, may be formed in the groove 210, and a corresponding through hole can be formed in the electrode connecting portion 240. The electrode connecting portion 240 can then be securely mounted to the base plate 230 by passing the hook through the through hole of the electrode connecting portion 240. However, this is only an example of a method of mounting the electrode connecting portion 240 to the base plate 230, and the present invention is not limited thereto. Any other method through which the electrode connecting portion 240 can be mounted to the base plate 230 may be used so long as it does not depart from the present invention. For example, the electrode connecting portion 240 may be coupled to the base plate 230 by a sliding coupling, press-fitting or snap-fitting method.

Additionally, in the above description, the electrode connecting portions 240 include the first to fourth electrode connecting portions 240a to 240d, but the present invention is not limited thereto. The number of the electrode connecting portions 240 may be changed depending on the number of the electrodes included in the electrode portion 140 formed on the LED block substrate 110.

Preferably, the base plate 230 for supporting the connecting members 220 and the electrode connecting portions 240 is formed of a nonconductive material for electrically isolating the electrode connecting portions 240 from each other. The base plate 230 is preferably sufficiently small that it does not block or impede light emitted from the LED. However, the present invention is not limited thereto. After the LED blocks 100 are fastened, the base plate 230 is placed between the LEDs 160 respectively positioned on the coupled LED blocks 100, so that the base plate 230 is preferably formed of a reflective material. That is, the base plate 230 is preferably formed of a material, such as polycarbonate-white, identical to a reflection plate formed in a peripheral portion of the LED 160, or a material, such as $TiO_2$-mixed resin, identical to a side mold formed in the peripheral portion of the LED 160, so that the base plate 230 can function as a reflection plate.

Alternatively, an exposed surface of the base plate 230 may be coated with a reflective material to provide a reflection function. Such reflective base plates 230 can improve the light emission efficiency of the light source.

In the meantime, the connector 200 may include a supporter 250 for supporting a variety of sheets disposed over the light source. The supporter 250 may be formed integrally with the base plate 230 to protrude from a surface thereof and opposite to the surface on which the electrode connecting portion 240 is formed. After the connecting member 220 connects the LED blocks 100, the supporter 250 supports optical sheets disposed thereover. The supporter 250 can have a top-narrow bottom-wide shape, which is wide at a proximal portion adjacent to the base plate 230 and becomes narrow as it extends from the base plate 230. The distal end of the supporter 250, i.e., the portion being in contact with the optical sheet, is flat. Preferably, the supporter 250 is transparent, and may be made of a light scattering material so that light emitted from the LED 160, which is a point light source, can be diffused in a lateral direction.

Much of the prior art utilizes separate electrical connectors and mechanical fasteners. In contrast, this embodiment of the invention utilizes a connector 200 that combines both electrical and mechanical connections. This offers the advantage of reducing the number of parts required, thus reducing production complexity and cost. Also, as the connecting member is easily coupled to the substrate via the through hole formed in the substrate, this embodiment allows for a quicker, simpler assembly process. Further, when the thickness of the connector is designed so that the connector does not intercept the light emitted from the LED, defects such as dark regions can be prevented.

Moreover, in the prior art, connectors mounted to one side of LED blocks are usually alternately coupled to the other sides thereof during the assembly process, and the wiring is then arranged. However, in this embodiment of the invention, the connecting member is inserted into the through hole formed in the substrate of the LED block, simultaneously achieving both electrical connection and mechanical fastening while also providing for ease of manufacture.

<Second Embodiment>

Hereinafter, the second embodiment of the present invention will be described. The second embodiment of the present invention relates to a light source block assembly different in fastening structure from the first embodiment. The descriptions of the second embodiment overlapping with those of the aforementioned first embodiment will be omitted or briefly explained.

Figure 4:
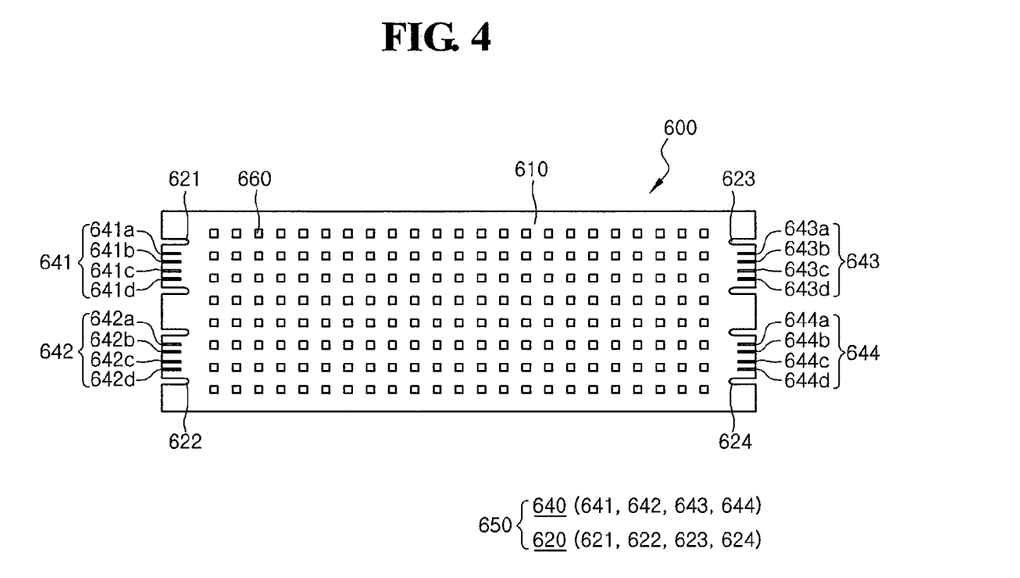
FIG. 4 is a plan view illustrating a light emitting diode block.
Figure 5A:
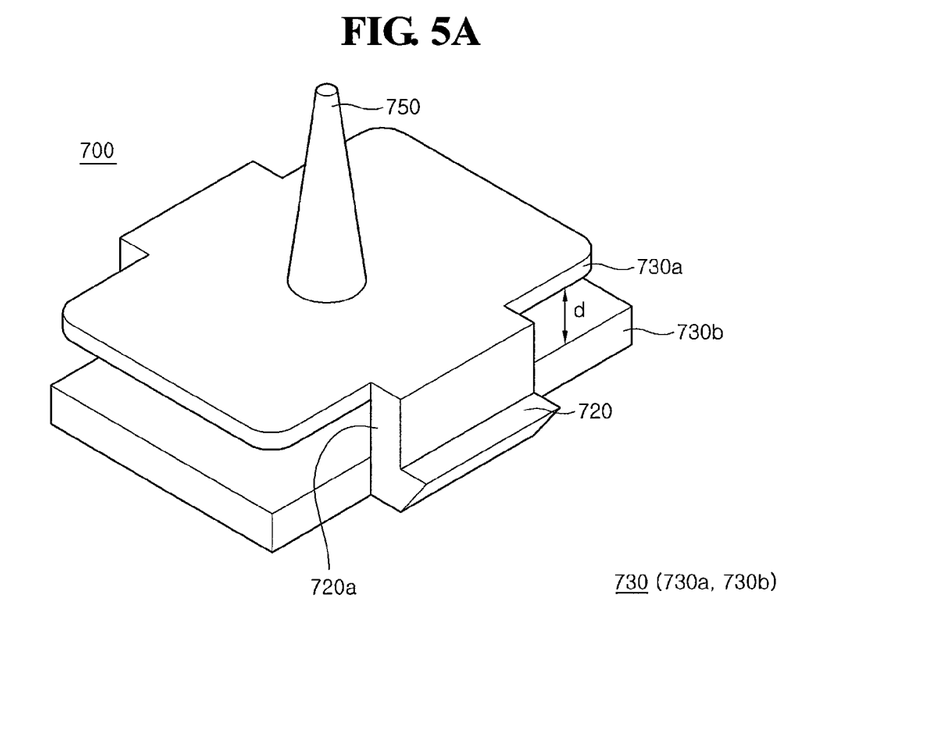
FIGS. 5A and 5B are a perspective view and a side view illustrating a connector according to a second embodiment of the present invention, respectively.
Figure 5B:
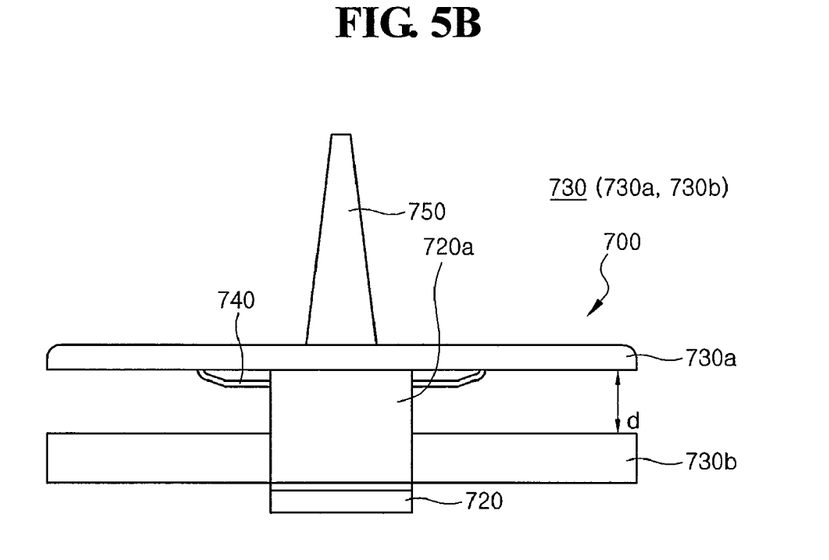
Figure 6A:
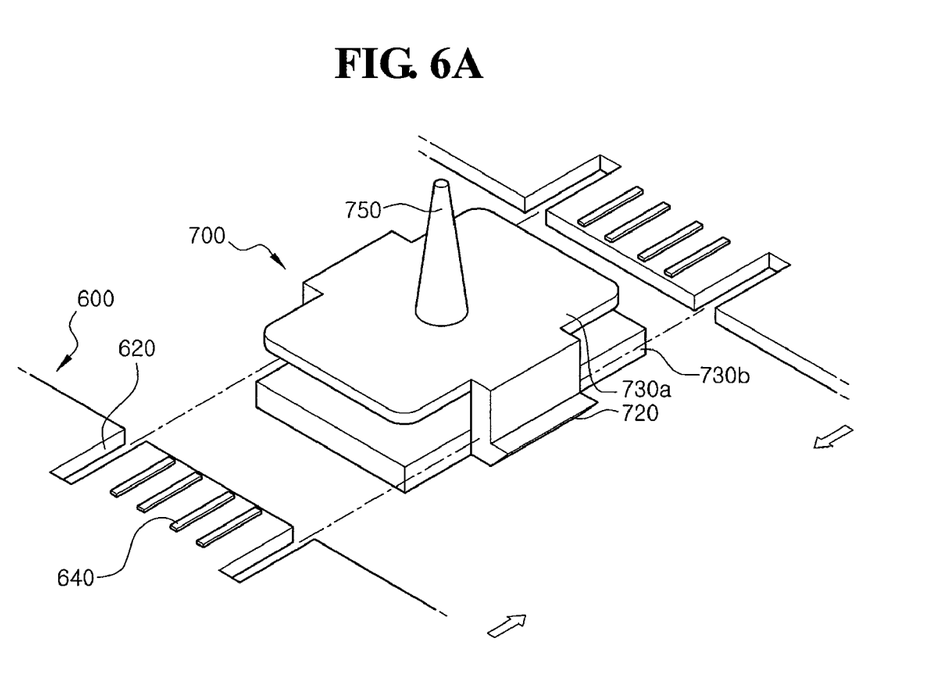
FIGS. 6A and 6B are perspective views illustrating states before and after the connector according to the second embodiment of the present invention is fastened to the light emitting diode blocks, respectively.
Figure 6B:
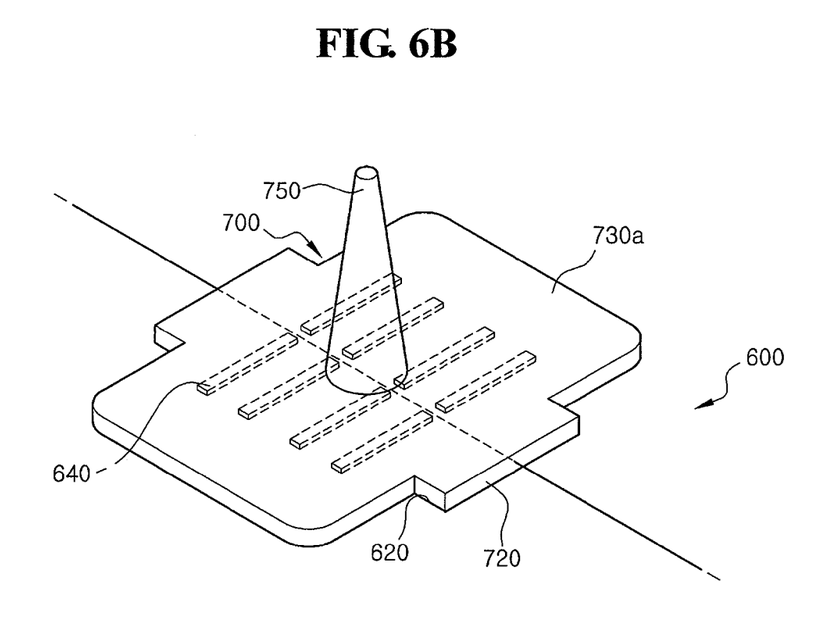

FIG. 4 is a plan view illustrating a light emitting diode block of the second embodiment of the invention. FIGS. 5A and 5B are, respectively, a perspective view and a side view illustrating a connector according to this second embodiment. FIGS. 6A and 6B are perspective views illustrating states before and after the connector of this second embodiment is fastened to the light emitting diode blocks, respectively.

As shown in FIG. 4, an LED block 600 includes LEDs 660, a substrate 610 for mounting the LEDs 660 thereto, and connecting portions 650 formed on both opposite sides of the substrate 610.

In order to mount the plurality of LEDs 660 and apply external power thereto, predetermined wiring is formed on the substrate 610. The plurality of LEDs 660 can be electrically connected to each other through the wiring. In addition, the substrate 610 includes connecting portions 650 for connecting the plurality of LED blocks 600.

As with the first embodiment above, the connecting portions 650 provide both mechanical and electrical connections between the LED blocks 600. The connecting portions 650, each of which is composed of through portions and electrode portions 640 as a group, are formed on both sides of the substrate 610.

The through portions may be manufactured in the form of indentations 620 formed in the substrate. The indentation 620 is formed in the shape of a slit with a predetermined length. The indentation 620, to which a connector to be explained later is coupled to provide fastening force between the plurality of LED blocks 600 when they are connected, may include first to fourth indentations 621, 622, 623 and 624. Here, each of the first to fourth indentations 621, 622, 623 and 624 is composed of a pair of slits. Preferably, the first and second indentations 621 and 622 are formed in one side of the substrate 610 to be spaced apart from each other, and the third and fourth indentations 623 and 624 are formed in the other side of the substrate 110 to be spaced apart from each other. However, the present invention includes any number of indentations formed so as to facilitate interconnection between substrates. In addition, the indentation 620 is preferably formed in a surface of the substrate 610 to be coupled with a connecting member of the connector.

The electrode portions 640, which are to supply external power to the LEDs 660, may include first to fourth electrode portions 641, 642, 643 and 644. Each electrode portion 640 is formed between the pair of indentations 620.

The electrode portion 640 extends from wiring (not shown) formed on the substrate 610 and is formed by exposing the wiring to both the opposite sides of the substrate 610. The electrode portion 640 may be formed adjacent to the indentation 620 so as to more firmly engage the electrode connecting portion 740 when the substrate 610 is coupled to the connector 700.

As shown in FIGS. 5A and 5B, a connector 700 for coupling the LED blocks 600 (FIG. 4) includes upper and lower base plates 730a and 730b, connecting members 720 connected to the upper and lower base plates 730a and 730b, and electrode connecting portions 740.

The connecting members 720 are for coupling the indentations 620 (FIG. 4) of the LED blocks, and may be provided in a pair, as shown. A hook is illustrated in the second embodiment of the present invention as an example of the connecting member 720. The connecting member 720 is inserted into and fastened to the indentations 620 of two of the LED blocks. To this end, the connecting member 720 is preferably formed corresponding in shape to the indentations 620 formed in the substrate 610. That is, as shown in FIGS. 6A and 6B, the LED block 600 is inserted into a gap d between the upper base plate 730a and the lower base plate 730b, while the side portions 720a of the connecting members 720 are inserted into the indentations 620. As the LED block 600 is inserted into the gap d, the thickness of the LED block 600 is preferably less than or equal to the gap d. When the LED block 600 is inserted into the gap d, the hook-type connecting member 720 supports the LED block 600. That is, a portion of the LED block 600 inserted into the gap d is supported by the lower base plate 730b, and a surrounding portion thereof is supported by an end projection of the connecting member 720. If desired, a concavo-convex coupling may be made between the rear surface of the substrate 610 and the end projection of the connecting member 720 to be brought into contact therewith, to improve the integrity of the connection. The invention contemplates that the hook shape of the connecting member 720 may be changed in various forms other than that shown in the figures.

As shown in FIGS. 6A and 6B, the electrode connecting portion 740, which connects the electrode portions 640 of two of the LED blocks (i.e., places them in electrical communication with each other) when they are coupled to each other, is formed corresponding to the electrode portions 640 of the LED block 600. In addition, the electrode connecting portion 740 preferably has elasticity, allowing it to be more firmly connected to the electrode portion 640 of the substrate 610.

The connector 700 includes upper base plate 730a and lower base plate 730b, so that the electrode connecting portions 740 are preferably configured to be coupled to the upper base plate 730a in a sliding manner. The lower base plate 730b can be omitted. In this case, the connecting members 720 are inserted into the through portions (i.e., indentations 620) to fasten the LED blocks, and the end projections of the connecting members 720 fixedly support the bottom surfaces of the LED blocks.

The connection of this embodiment provides for firm fastening between connecting members 720 and LED blocks 600, thus preventing disconnection or release due to external vibration or the like. That is, elastic pressure exerted by the electrode connecting portions 740 on the electrode portions 640, such as when the electrode connecting portions 740 are configured to act essentially as leaf springs, helps to create a secure connection between the two. Moreover, if the indentation 620 is formed sufficiently deeply, the indentation 620 and the connecting member 720 can be more firmly coupled. Furthermore, the upper and lower base plates 730 can both assist in creating a secure connection, if the gap d is sized properly.

The base plate 730 is configured to support the connecting members 720 and the electrode connecting portions 740. Preferably, the upper base plate 730a is formed smaller in thickness than the LEDs 660.

In addition, a supporter 750 for supporting a variety of sheets disposed over the light source may be formed on the connector 700 to protrude therefrom. Preferably, the supporter 750 is made of a transparent material, and may be made of a light scattering material so that light emitted from the LED 660 can be diffused in a lateral direction.

Furthermore, as the connecting members 720 are inserted into the indentations 620, the resistance to decoupling caused by vibration and the like can be improved. A user can easily control the fastening force of the LED blocks 600 by adjusting the depth of the indentations 620 and the size of the connecting members 720 coupled thereto.

<Third Embodiment>

Hereinafter, the third embodiment of the present invention will be described. The third embodiment of the present invention has a still different fastening structure. The descriptions of the second embodiment overlapping with those of the aforementioned first embodiment will be omitted or briefly explained.

Figure 7:
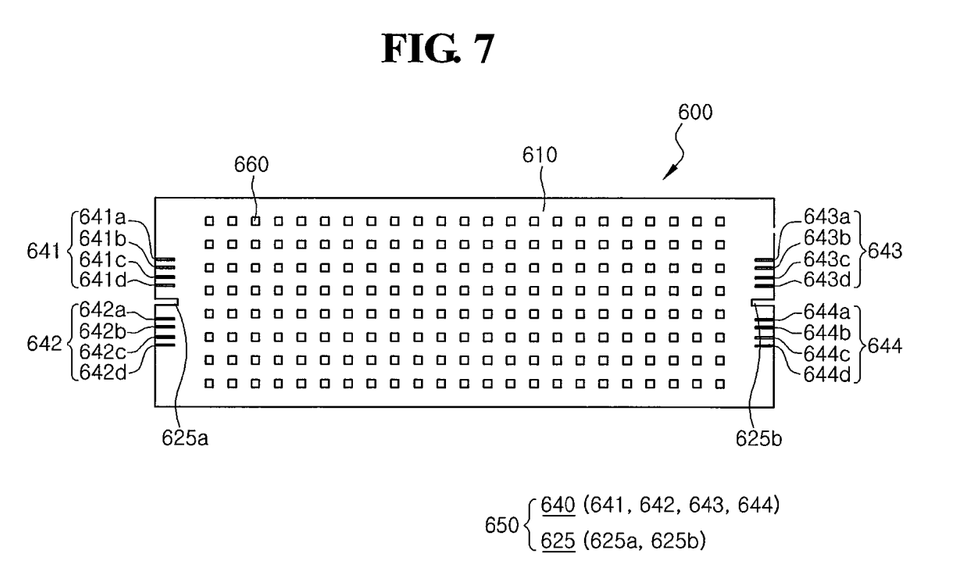
FIG. 7 is a plan view illustrating a light emitting diode block.
Figure 8A:
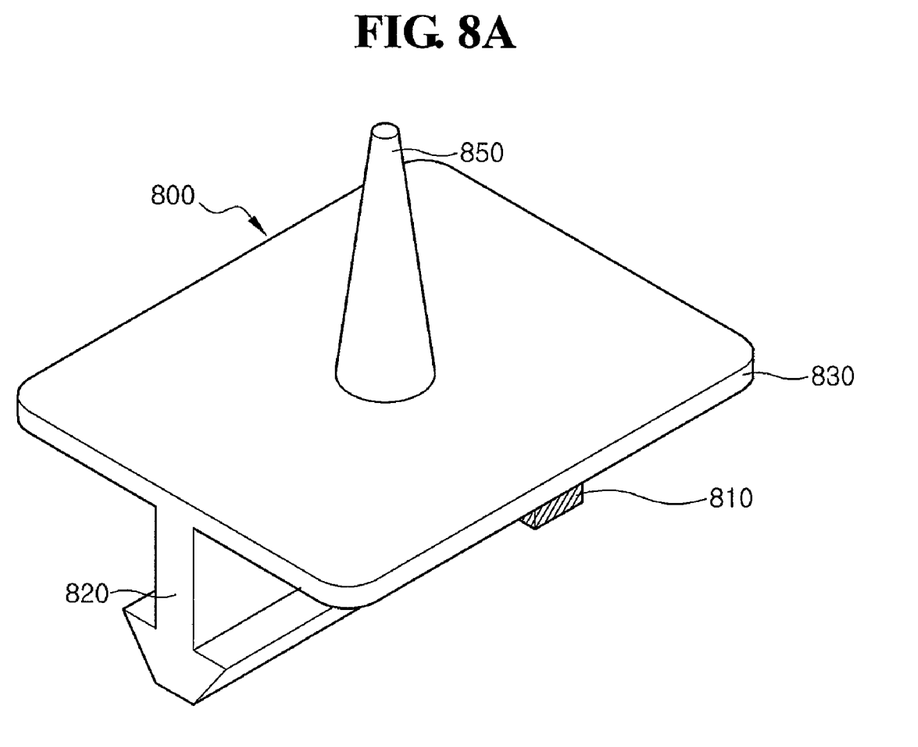
FIGS. 8A and 8B are a perspective view and a side view illustrating a connector according to a third embodiment of the present invention.
Figure 8B:
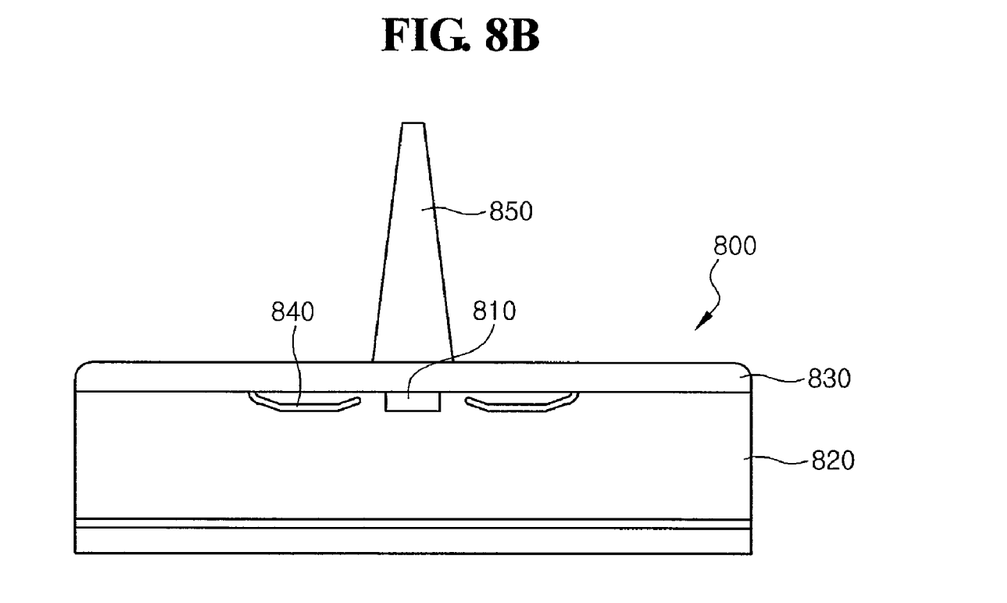
Figure 9:
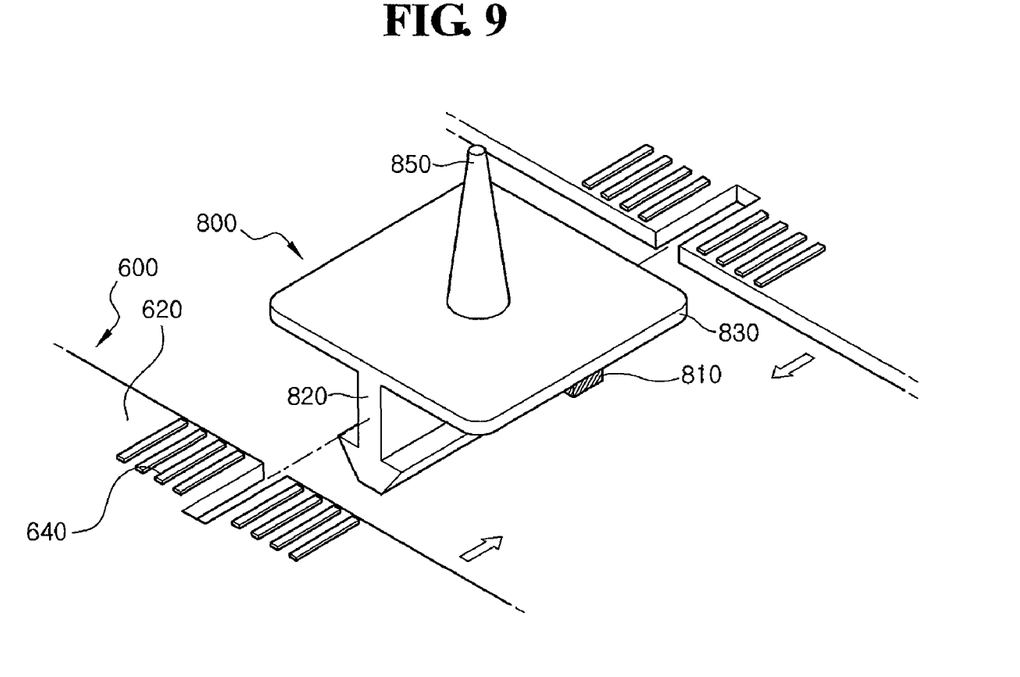
FIG. 9 is a perspective view illustrating a state before the connector according to the third embodiment of the present invention is fastened to the light emitting diode blocks.

FIG. 7 is a plan view illustrating a light emitting diode block according to the third embodiment of the present invention. FIGS. 8A and 8B are a perspective view and a side view respectively, illustrating a connector according to a third embodiment of the present invention. FIG. 9 is a perspective view illustrating a state before this connector is fastened to the light emitting diode blocks.

As shown in FIG. 7, an LED block 600 includes an LED 660, a substrate 610 for mounting the LEDs 660 thereon, and connecting portions 650 formed on both opposite sides of the substrate 610.

The connecting portion 650 for connecting the plurality of LED blocks 600 is formed on the substrate 610 of the LED block 600. The connecting portion 650 provides fastening force between the plurality of LED blocks 600 and allows power to be supplied to the LEDs 660 when the plurality of LED blocks 600 are connected. The connecting portions 650, each of which is composed of an indentation 625a or 625b and electrode portions 640 as a group, are formed on both the opposite sides of the substrate 610.

The indentations 625, to which a connector to be explained later is coupled to provide fastening force between the plurality of LED blocks 600, have largely the same function as the indentation 620 in the second embodiment above, but differ in position and number from the indentation 620.

A connector 800 shown in FIGS. 8A and 8B has only a single connecting member 820 and corresponds to two groups of electrode portions. The connector 800 may include a member such as the lower base plate 730b of FIGS. 5A and 5B.

As shown in FIGS. 8A and 8B, the connector 800 for coupling the LED blocks 600 (FIG. 7) includes a base plate 830, a connecting member 820 connected to the base plate 830, and electrode connecting portions 840.

To provide fastening force, this embodiment employs a "hook shaped" connecting member 820. Preferably, the connecting member 820 is inserted into and fastened to the indentations 625 of two of the LED blocks. To this end, the connecting member 820 is preferably formed corresponding in shape to the indentation 625. Moreover, concavo-convex coupling or snap-fit coupling may be applied to enhance the fastening force.

When connected, the electrode connecting portion 840 presses against, and forms a connection with, the substrate 610. Elasticity or flexibility in the electrode connecting portion 840 can help isolate the substrate 610 from the base plate 830, preventing the base plate 830 from contacting the substrate 610 and causing damage. This may be true even through the force of an external impact. However, sufficiently large impacts may still result in the base plate 830 contacting the substrate 610. When such collision occurs, the physical impact is transferred to the base plate 830 or the substrate 610, potentially resulting in damage to the substrate 610. In order to prevent this, a buffering portion 810 may be provided on the surface of the base plate 830 facing the substrate 610. The buffering portion 810 may be formed of a soft material such as resin or softened resin, or a member with a shock-absorbing spring mounted. The position of the buffering portion 810 is not limited to that shown in the figures. The invention contemplates any configuration/construction of buffering portion 810, placed in any position, consistent with the reduction or absorption of shock to the substrate 610. The buffering portion 810 is applicable to the first and second embodiments, as well.

As compared with the second embodiment, the third embodiment can simplify the processing of the indentations 625 of the LED block 600, and reduce the number of connectors 800.

In addition, the third embodiment can provide for attenuation of impact between the LED blocks and the connector, so that the two cannot be easily decoupled from each other or damaged by external impact.

The above embodiments may be modified individually or collectively within the scope of the technical spirit of the present invention.

Backlight Unit

A backlight unit according to the present invention is now described with reference to the accompanying drawings. The descriptions overlapping with those described above will be omitted or briefly explained.

Figure 10:
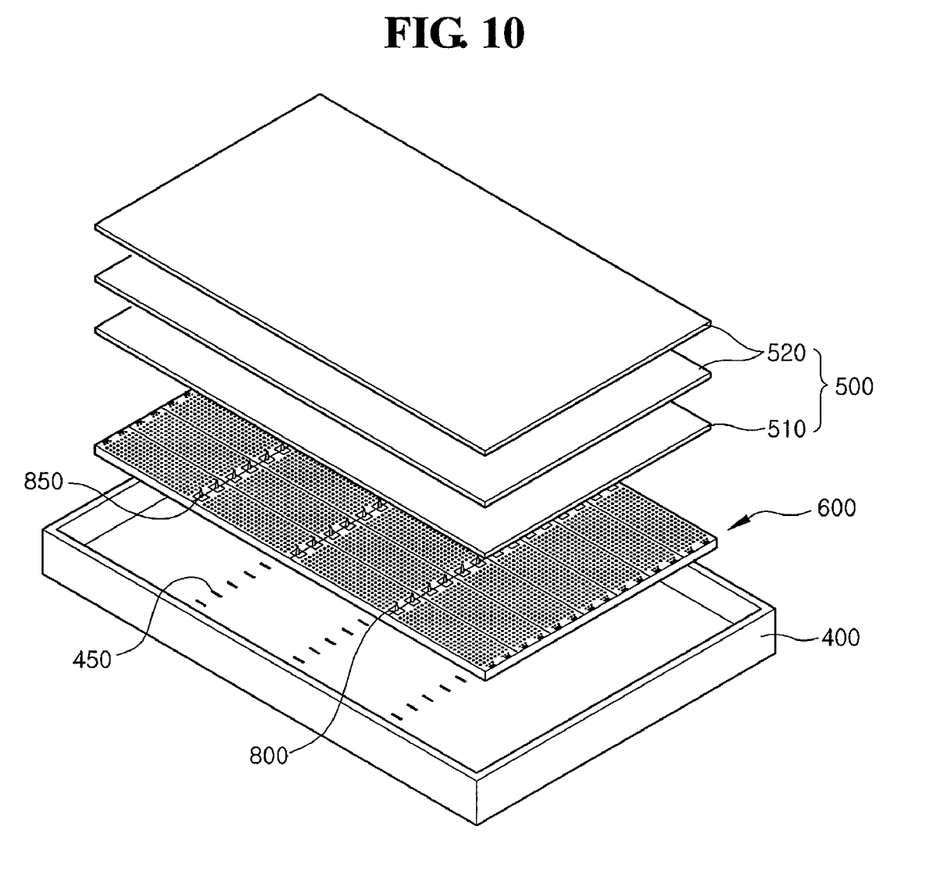
FIG. 10 is a schematic exploded perspective view illustrating a backlight unit according to an embodiment of the present invention.
Figure 11:
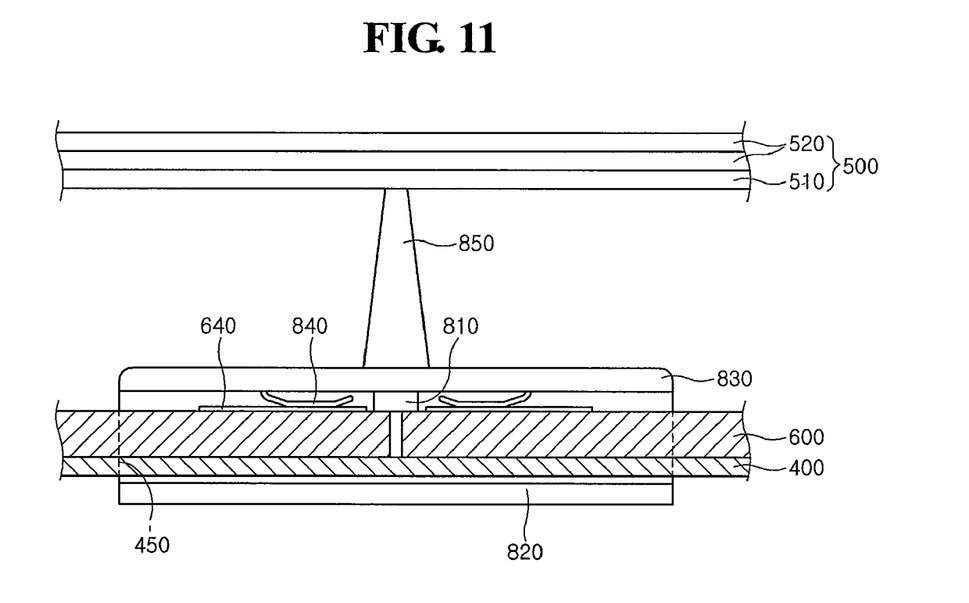
FIG. 11 is a schematic sectional view illustrating a state after the backlight unit according to the embodiment of the present invention is assembled.
Figure 12:
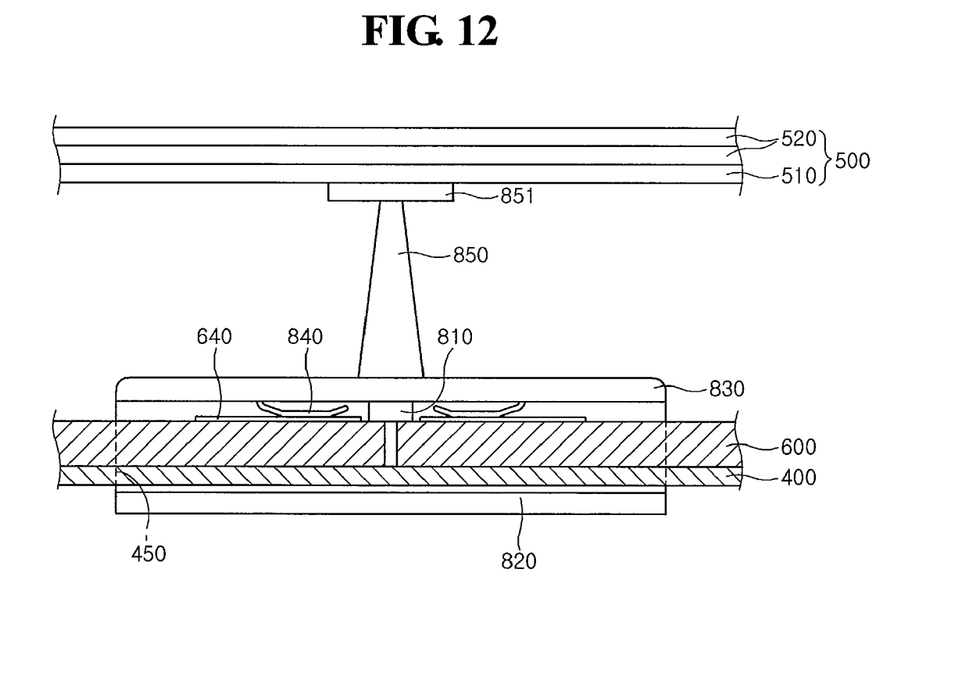
FIG. 12 is a view illustrating a modified example of FIG. 11.

FIG. 10 is a schematic exploded perspective view illustrating a backlight unit according to an embodiment of the present invention. FIG. 11 is a schematic sectional view illustrating a state after the backlight unit according to the embodiment of the present invention is assembled, and FIG. 12 is a view illustrating a modified example of FIG. 11.

As shown in FIG. 10, the backlight unit according to this embodiment of the present invention includes an LED block assembly, an optical sheet 500 disposed over the LED block assembly, and a lower receiving member 400 for accommodating the LED block assembly and the optical sheet 500.

In the LED block assembly, a plurality of LED blocks 600 are coupled to each other through the connectors 800 of the previous embodiment. Although the backlight unit of this embodiment employs connectors 800, other connectors, such as the aforementioned connectors 200 or 700 may be applied thereto.

The lower receiving member 400 is formed in the shape of a rectangular hexahedral box with an open top face, and has an accommodation space with a predetermined depth defined therein. The lower receiving member 400 may include a bottom, and sidewalls vertically extending from the edges of the bottom. In addition, coupling holes 450 are formed in the bottom so that the connecting members 820 of the connectors 800 can be fastened thereto. The LED blocks 600 and the optical sheet 500 may be accommodated in and fixed to the accommodation space of the lower receiving member 400.

In this embodiment, the connecting member 820 can be coupled to the lower receiving member 400. That is, a coupling hole 450 corresponding to a connecting member 820 is formed in the lower receiving member 400, allowing the connecting member 820 to be coupled to the coupling hole 450 of the lower receiving member 400 through the indentation 620 formed in the substrate 610. It is preferred that a size of a lower portion of the connecting member 820 is almost equal to or smaller than a size of the coupling hole 450. In addition, when the LED blocks 600 are coupled and fixed to the lower receiving member 400 using the connecting members 820, a reflection plate (not shown) formed between the LEDs may be affixed.

As described above, the connecting member 820 of the connector 800 not only fastens the LED blocks 600 to each other but also fastens the LED blocks 600 to the lower receiving member 400, thereby improving the reliability of the backlight unit.

The optical sheet 500 improves the quality and efficiency of light emitted from the plurality of LED blocks 600. In this embodiment, the optical sheet 500 may include a diffusion sheet 510 and prism sheets 520. The diffusion sheet 510 is positioned over the plurality of LED blocks 600, uniformly diffuses light emitted from the plurality of LED blocks 600, and transfers the light in a front direction of the prism sheets 520 and an LCD panel, thereby widening viewing angle and reducing diffusion of a bright defect, bright line, spot or the like. The prism sheet 520 increases luminance by refracting and condensing the light exiting from the diffusion sheet 510, and transfers the light to the LCD panel. To this end, the prism sheets 520 are preferably positioned over the plurality of LED blocks 600, i.e., between the plurality of LED blocks 600 and the LCD panel.

As shown in FIG. 11, the optical sheet 500 can be supported by supporters 850 formed on the connectors 800. The supporter 850 protrudes from an upper portion of the connector 800, and supports the optical sheet 500, specifically the diffusion sheet 510, so as to maintain a predetermined amount of space between the sheet 500 and the LED block 600. The supporters 850 also help support the optical sheet 500, so that the optical sheet 500 can be placed without sagging. As LCD screen size increases, the size of the optical sheet 500 must also increase. Accordingly, the aforementioned configuration is of increasing utility. That is, when a large-size optical sheet is employed in a backlight unit, the optical sheet sags due to its self weight, thereby adversely affecting light emission efficiency and luminance uniformity. However, the supporters 850 of the plurality of connectors 800 support the optical sheet 500, reducing or substantially eliminating sag without increasing the number of parts.

The supporter 850 may include an auxiliary supporting member 851 as shown in FIG. 12, thereby more stably contacting and supporting the optical sheet 500, specifically, the diffusion sheet 510. In FIG. 12, the auxiliary supporting member 851 is formed in the shape of a flat plate on the supporter 850, although the invention contemplates any suitable shape. If desired, this would allow contact area with the diffusion sheet 510 to be increased beyond that shown in FIG. 11.

Liquid Crystal Display

An LCD using the aforementioned backlight unit according to the present invention will be described with reference to the accompanying drawings. The descriptions overlapping with those described above will be omitted or briefly explained.

Figure 13:
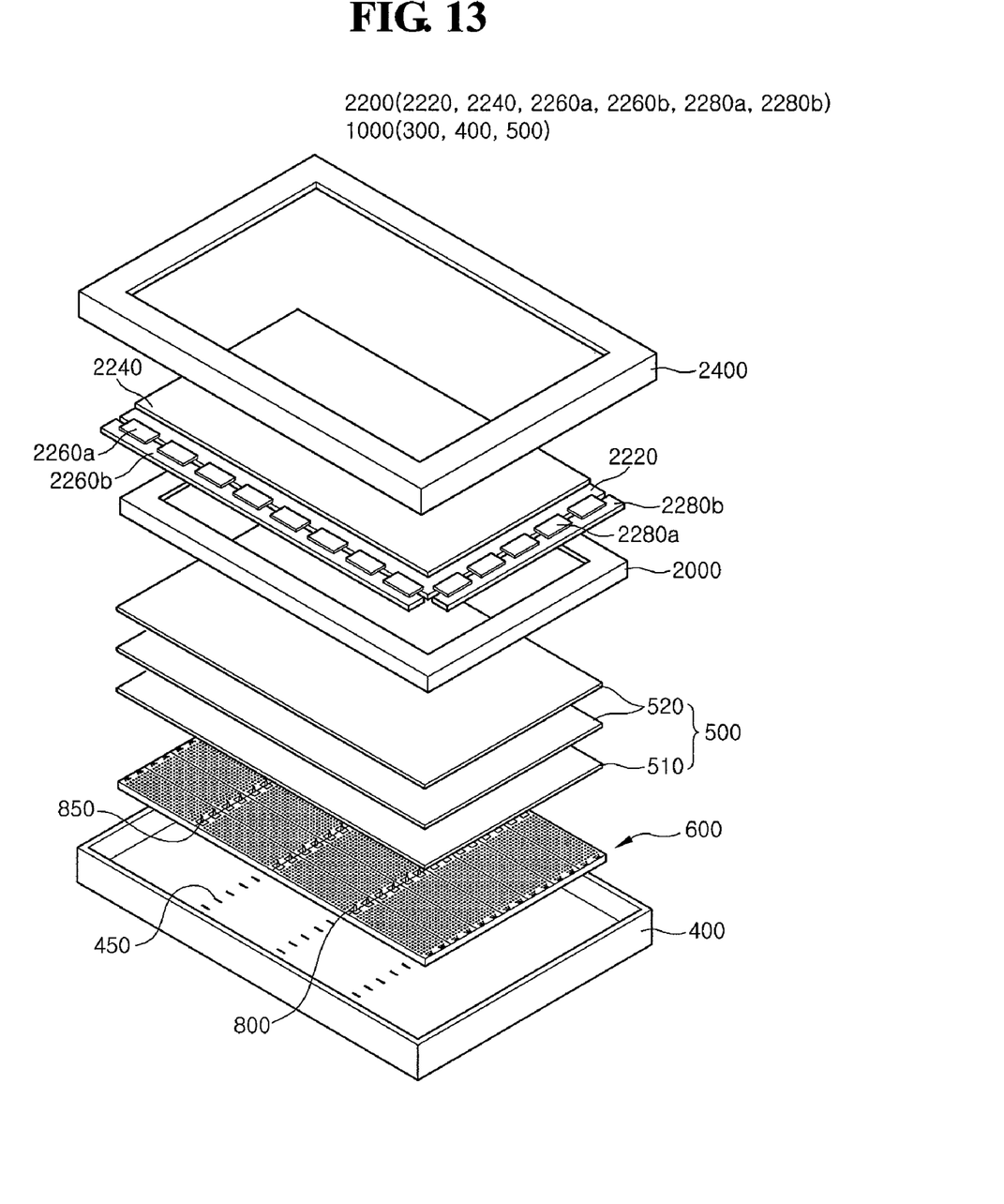
FIG. 13 is a schematic exploded perspective view illustrating a liquid crystal display according to an embodiment of the present invention.
Figure 14:
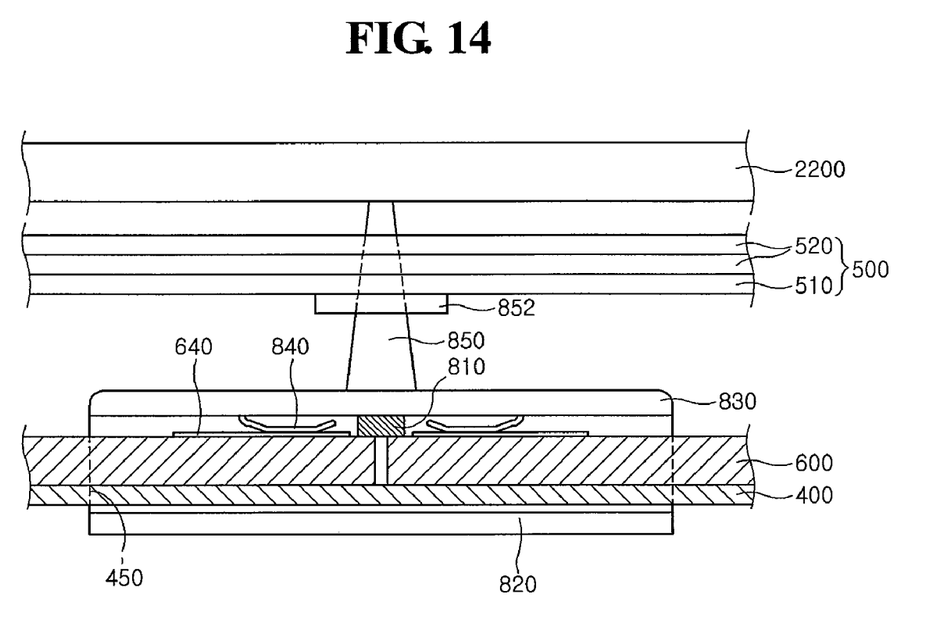
FIG. 14 is a schematic sectional view illustrating a portion of the liquid crystal device with a supporter mounted therein according to the embodiment of the present invention.

FIG. 13 is a schematic exploded perspective view illustrating a liquid crystal display according to an embodiment of the present invention, and FIG. 14 is a schematic sectional view illustrating a portion of the liquid crystal device with a supporter mounted therein according to the embodiment of the present invention.

The LCD of this embodiment of the present invention includes an LCD panel 2200, a backlight unit 1000 having the LED block assembly 600, an optical sheet 500 disposed over the LED block assembly 600, and a lower receiving member 400 for accommodating the LED block assembly and the optical sheet 500. Also included are a mold frame 2000 for accommodating the LED block assembly 600 and the optical sheet 500, and an upper receiving member 2400 for surrounding side portions and a predetermined region of an upper portion of the LCD panel 2200 and the backlight unit 1000.

The LCD panel 2200 includes a thin film transistor substrate 2220, data-side and gate-side tape carrier packages (TCP) 2260a and 2280a connected to the thin film transistor substrate 2220, data-side and gate-side PCBs 2260b and 2280b respectively connected to the data-side and gate-side TCPs 2260a and 2280a, a color filter substrate 2240 corresponding to the thin film transistor substrate 2220, and a liquid crystal layer (not shown) injected between the thin film transistor substrate 2220 and the color filter substrate 2240. The LCD panel 2200 may further include polarization plates (not shown) formed on an upper portion of the color filter substrate 2240 and a lower portion of the thin film transistor substrate 2220 in correspondence thereto.

The backlight unit 1000 includes the LED block assembly for emitting light, the optical sheet 500 provided over the LED block assembly to improve the quality and efficiency of the light emitted from the LED block assembly, and the lower receiving member 400 for accommodating the LED block assembly and the optical sheet 500. The backlight unit 1000 may also include a driving unit (not shown) for driving the LED block assembly.

The mold frame 2000 is formed in the shape of a quadrangular frame, and includes a plane portion and a sidewall portion bent from the plane portion at a right angle. A seating portion (not shown) may be formed on the plane portion so that the LCD panel 2200 can be seated thereon. The seating portion may include fixing protrusions for aligning and positioning the LCD panel 2200, or predetermined stepped projection surfaces. The mold frame 2000 positions and fixes the optical sheet 500 and the LED block assembly in the lower receiving member 400.

The upper receiving member 2400 is formed in the shape of a quadrangular frame, and includes a plane portion and a sidewall portion bent from the plane portion at a right angle. The plane portion of the upper receiving member 2400 supports the LCD panel 2200, and the sidewall portion faces and is coupled to the sidewalls of the lower receiving member 400. Preferably, the upper receiving member 2400 and the lower receiving member 400 are formed of a metal having sufficient strength and stiffness, as well as relatively light weight.

The LED block assembly is manufactured according to the aforementioned various embodiments. In the embodiment shown in FIGS. 13 and 14, the LED block assembly includes the connector 800 of the aforementioned third embodiment. The supporters 850 formed on the connector 800 protrude toward the optical sheet 500 and support the LCD panel 2200, thereby preventing the LCD panel 2200 from being bent due to its own weight. In addition, the auxiliary supporting members 852 of the supporter 850 may support the optical sheet 500. In this case, predetermined through holes may be formed in the optical sheet 500 so that the supporters 850 can pass through the optical sheet 500 and support the LCD panel 2200. The auxiliary supporting members 852 can hermetically seal the through holes to prevent light leakage as well as to support the optical sheet 500. The supporters 850 for supporting the LCD panel 2200 may include auxiliary supporting members 851 as shown in FIG. 12, thereby more stably supporting the LCD panel 2200.

As compared with the prior art's separate electrical and mechanical connectors, the fastening structure of the present invention simultaneously provides both mechanical and electrical connection, reducing the number of components and thus reducing production cost. Further, as the thickness of the connector is preferably designed so that the connector does not substantially block light emitted from the LED, defects such as dark regions can be prevented.

Moreover, in the prior art, connectors mounted to one side of LED blocks are usually alternately coupled to the other sides thereof during the assembly process, and the wiring is then arranged. However, in this embodiment of the invention, the connecting member is inserted into the through hole formed in the substrate of the LED block, simultaneously achieving both electrical connection and mechanical fastening while also providing for ease of manufacture.

Furthermore, the fastening structures of the present invention provide improved resistance to decoupling caused by vibration and the like. A user can easily control the fastening force on the LED blocks by adjusting the depth of the indentations and the size of the connecting members coupled thereto.

Accordingly, in the manner described above, embodiments of the present invention make it is possible to simplify the LED block assembly process by reducing the number of connectors. In addition, the third embodiment can attenuate impact so that the LED blocks and the connector cannot be easily decoupled from each other by external impact.

According to the embodiments of the present invention, the connector not only fastens the LED blocks to each other but can also fasten the LED blocks to the lower receiving member at the same time, thereby improving the durability and reliability of the backlight unit and display.

In addition, as the supporter of the connector supports an optical sheet, sag in the optical sheet can be reduced or substantially eliminated. Thus, even if the optical sheet has a large size, it does not significantly sag due to its self weight. Accordingly, embodiments of the invention help to prevent degradation of light emission efficiency and luminance uniformity. Moreover, auxiliary supporting members can be employed to increase contact area with the supporter, more stably supporting the optical sheet.

According to the embodiments of the present invention, the supporter of the connector supports the LCD panel as well as the optical sheet, thereby preventing bending of the LCD panel caused by its self weight and deformation of the optical sheet.

Although the present invention has been explained with reference to the drawings and the preferred embodiments, it is understood that those skilled in the art can make various modifications and changes thereto without departing from the technical spirit of the invention defined by the appended claims. Specifically, an LED has been exemplified as a light source in the entire description of the present invention. However, it is only an example of a light source for implementing the present invention. The configuration of the present invention is not limited thereto.

In addition, although the concavo-convex coupling between the through portion of the light source block and the connecting member of the connector has been illustrated in the entire descriptions of the specification, the technical spirit of the present invention is not limited thereto but can be easily modified in various forms. For example, a concave portion may be formed in the connector and a convex portion may be formed on the light source block. Alternatively, the concave-and-convex portion may be formed on the connector, and convex-and-concave portion corresponding to the concave-and-convex portion may be formed on the light source block.

Moreover, although the coupling of a pair of LED blocks using the connector has been explained in the drawings and the details of the present invention, it is possible to couple two or more LED blocks. For example, a connector can be used in an intersection point of edges of four LED blocks to fasten the four LED blocks to each other at a time, or to fasten the four LED blocks and a lower receiving member at a time. In this case, the connector includes connecting members that can be connected to the LED blocks, respectively, and each of the LED blocks includes a fastener corresponding to the connecting member.

It is to be understood that the invention is not limited to the disclosed embodiments. Instead, it is intended to cover various modifications and equivalent arrangements included within the spirit and scope of the following claims.

What is claimed is:

1. A light source block assembly, comprising:
    a plurality of light source blocks, each of the light source blocks including a substrate having an external connection electrode portion formed on one end and a light source formed thereon, the electrode portion of each light source block in electrical communication with the respective light source so as to supply power to the respective light source;
    a connector having a single continuous body, the connector electrically connecting at least two of the light source blocks and fastening the at least two light source blocks to each other along a first side of the body of the connector, the first side facing the at least two fastened light source blocks; and
    a supporter disposed on a second side of the body of the connector opposite to the first side, the supporter extending from the first side away from the at least two fastened light source blocks.

2. The light source block assembly as claimed in claim 1, wherein the connector comprises a base plate, a connecting portion formed on a first surface of the base plate to protrude therefrom, and an electrode connecting portion formed on the first surface of the base plate.

3. The light source block assembly as claimed in claim 2, wherein the electrode connecting portion is configured to flexibly engage one or more electrode portions.

4. The light source block assembly as claimed in claim 3, wherein the electrode connecting portion comprises a leaf spring or a protrusion.

5. The light source block assembly as claimed in claim 2, further comprising a buffering member disposed on the base plate.

6. The light source block assembly as claimed in claim 2, wherein the connecting portion comprises a hook.

7. The light source block assembly as claimed in claim 6, wherein a through portion is formed in each of the light source blocks so that the hook passes through and is fastened to the through portion.

8. The light source block assembly as claimed in claim 2, wherein the connector further comprises a pair of base plates spaced apart from each other to form a gap, the light source block insertable between the base plates.

9. The light source block assembly as claimed in claim 8, wherein a thickness of the light source block is less than or equal to the gap between the pair of base plates.

10. The light source block assembly as claimed in claim 2, wherein a through portion is formed in each of the light source blocks, and wherein the connecting portion is configured to be inserted into and fixed to the through portion of the light source block.

11. The light source block assembly as claimed in claim 2, wherein the supporter is disposed on a second surface of the base plate that is opposite the first surface of the base plate.

12. The light source block assembly as claimed in claim 2, wherein the base plate is formed of a reflective material, or an exposed surface of the base plate is coated with a reflective material.

13. The light source block assembly as claimed in claim 1, wherein the light source is a light emitting diode.

14. A backlight unit, comprising:
    a light source block assembly including a plurality of light source blocks, each of the light source blocks including:
        a substrate with a light source and an external connection electrode portion provided thereon;
        a connector having a single continuous body, the connector electrically connecting the light source blocks to each other and coupled to the substrate along a first side of the body of the connector, the first side of the connector facing the substrate; and
        a supporter disposed on a second side of the body of the connector opposite to the first side, the supporter extending from the first side away from the substrate; and
    a receiving member for accommodating the light source block assembly.

15. The backlight unit as claimed in claim 14, wherein a coupling hole is formed in the receiving member.

16. The backlight unit as claimed in claim 15, wherein the connector passes through the light source block and is fastened to the coupling hole.

17. The backlight unit as claimed in claim 14, further comprising an optical plate,
    wherein the supporter supports the optical plate.

18. A liquid crystal display, comprising:
a backlight unit including light sources, each of the light sources having a light emitting diode;
a light source block assembly having a plurality of light source blocks, each of the light source blocks including a substrate with at least one of the light sources and an external connection electrode portion provided thereon, and a connector having a single continuous body, the connector electrically connecting at least two of the light source blocks to each other and coupled to the at least two light source blocks along a first side of the body of the connector, the first side of the connector facing the at least two coupled light source blocks; a supporter disposed on a second side of the body of the connector opposite to the first side, the supporter extending from the first side away from the at least two coupled light source blocks; and a receiving member for accommodating the light source block assembly; and
a liquid crystal display panel supplied with light from the backlight unit so as to facilitate display of an image.

19. The liquid crystal display as claimed in claim 18, wherein the backlight unit further comprises an optical plate, and the supporter is configured to support at least one of the optical plate and the liquid crystal display panel.

20. The liquid crystal display as claimed in claim 19, wherein the supporter is formed with a supporting portion extending in a lateral direction relative to the liquid crystal display panel.

* * * * *